May 5, 1959     R. S. WALTON     2,884,729
DECOY
Filed Oct. 1, 1956
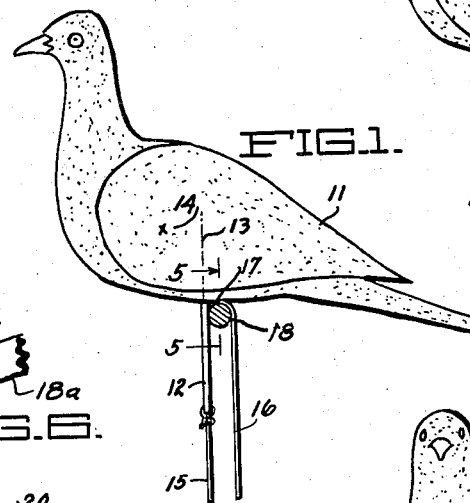
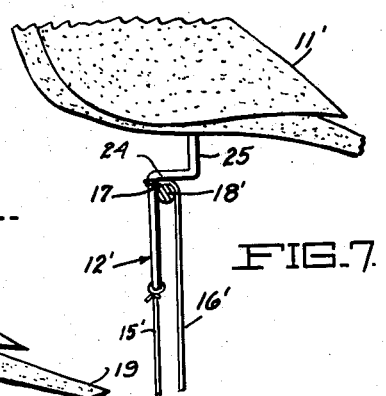
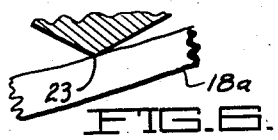
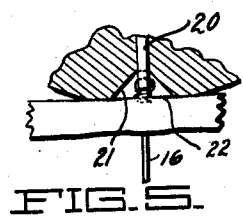
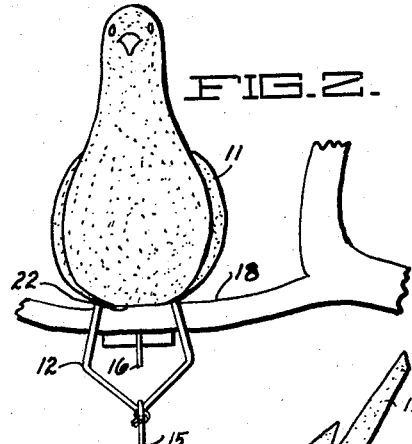
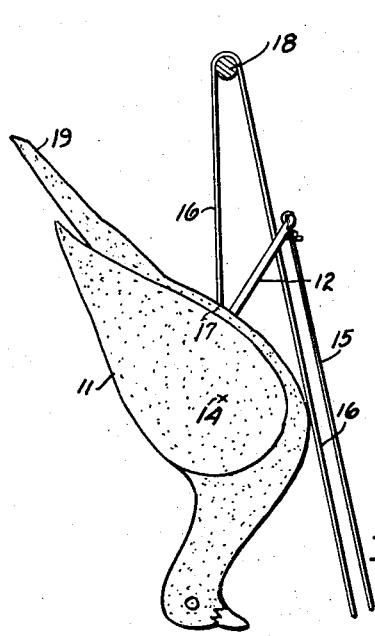
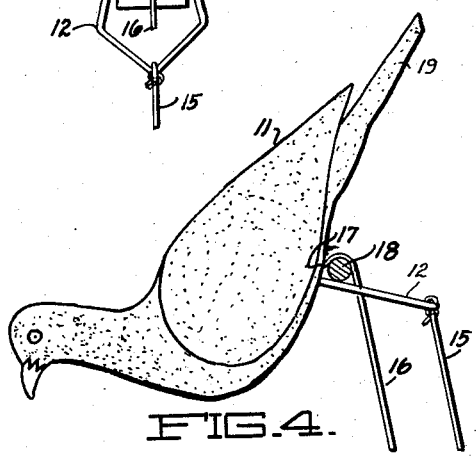
INVENTOR.
ROBERT S. WALTON
BY
Fred N. Schwend
ATTORNEY

United States Patent Office 2,884,729
Patented May 5, 1959

2,884,729

DECOY

Robert S. Walton, Los Angeles, Calif.

Application October 1, 1956, Serial No. 613,279

1 Claim. (Cl. 43—2)

This invention relates to decoys used for attracting birds and/or other animals.

It has been discovered that wild pigeons, doves, crows and similar wild birds may be attracted for hunting purposes by mounting decoys in trees at a considerable heighth above the ground. Obviously each decoy, to be effective, must be placed in a natural upright position and heretofore this has generally required that the hunter climb the tree and suitably clamp the decoys in position. Afterwards, the hunter must again climb the tree to retrieve the decoys.

The principal object of my present invention is to enable a person to properly mount decoys of the above type in trees or the like without having to climb such trees.

Another object is to enable decoys of the above type to be adjusted in any desired position from the ground.

Another object is to provide a decoy of the above type which is simple and inexpensive to manufacture.

The manner in which the above and other objects of the invention are accomplished will be readily understood on reference to the following specification when read in conjunction with the accompanying drawings wherein:

Fig. 1 is a side view of a decoy embodying a preferred form of the invention, the decoy being illustrated in a natural position on a tree limb.

Fig. 2 is a front view of the decoy when in its natural position.

Fig. 3 is a side view of the decoy illustrating the same in position assumed when it is being raised into position on a tree limb.

Fig. 4 is a view similar to Fig. 3 but illustrating the same after it has been raised to a selected tree limb but before being set in proper position.

Fig. 5 is a transverse sectional view taken along line 5—5 of Fig. 1 illustrating the means for anchoring one end of the elevating line to the decoy body.

Fig. 6 is a transverse sectional view similar to that of Fig. 5 but illustrating a modified form of the invention.

Fig. 7 is a side view similar to Fig. 1 but with parts broken, illustrating another modified form of the invention.

As shown in the drawings, the decoy comprises a decoy body 11 of wood or the like shaped to simulate a wild dove or other animal it is desired to attract.

A brace in the form of a substantially U-shaped bail 12 of still wire material is suitably anchored to the underside of the body 11. As seen in Fig. 1, the bail extends vertically from the body when the latter is in its natural position, and a vertical plane, indicated by the dot-dash line 13, passing through the bail is preferably located a short distance to the rear of the center of gravity 14 of the body.

As seen particularly in Fig. 2, the lower portions of the side legs of the bail 12 converge downwardly to a point at which one end of a tipper line or cord 15 is attached.

A second line or cord 16, which I will term an elevating line, is attached at 17 to the body 11 for the purpose of raising the decoy. It should be noted that the point of attachment 17 is to the rear of the center of gravity when the body is in its natural position and is slightly to the rear of the bail 12. This arrangement of bail 12 and point of attachment 17 enables the decoy to be remotely and properly positioned on a tree branch or the like 18 which may be of various diameters.

In preparing to elevate the decoy onto a tree branch which may be out of reach, a line (not shown) with a weight at one end is thrown over a selected branch 18. The free end of the elevating line 16 is then attached to the unweighted end of the first mentioned line and is thereby drawn over the branch to elevate the decoy. As the decoy is raised it assumes a position shown in Fig. 3 by virtue of the relation between the point of attachment 17 and center of gravity as pointed out herein above. In this suspended position, the decoy is in an inverted position with the tail portion 19 and the bail 12 diverging upwardly from opposite sides of the adjacent part of the elevating line 16. Accordingly, the underside of the decoy body 11 will engage the branch 18 at a point directly adjacent the bail. As the decoy engages the branch 18 the elevating line will be ineffective to normally rock the decoy about the branch, but at this time, the decoy may be rocked toward its natural position shown in Fig. 1 by pulling on the tipper line 15 thus passing it through its position shown in Fig. 4. During this movement the elevating line 16 is held taut, maintaining the bail 18 against the side of the branch. Finally, when the decoy has reached its natural position or any other desired position about the branch, the lower free ends of both lines 15 and 16 are anchored to a suitable support (not shown) such as the base of the tree or are attached to a suitable weight.

By swinging the weight, the decoy could be made to rock and thus aid in attracting birds, but it has normally been found best to maintain the decoy in a stationary position.

The point of attachment 17 preferably takes the form of a screw 20 attached to the decoy body 11 and located in a conical depression 21. The elevating line is attached to the screw 20, the head of the latter being located above the undersurface (as seen in Fig. 5) so as not to interfere with the rocking and sliding movement of the decoy over the branch.

It will be seen particularly in Figs. 2 and 5 that the undersurface of the decoy body 11 is preferably flattened slightly at 22 to permit the decoy to sit in an upright or normal manner when viewed from the front, and when resting on a horizontally extending tree limb.

When it is desired to retrieve the decoy, the elevating line 16 is released permitting the body to rock forwardly until it falls from the branch. However, if the decoy does not readily fall, the tipper line may be pulled to aid in retrieving the same.

In the modified form shown in Fig. 6, the undersurface is V-shaped, the undersides converging downwardly to a ledge 23. This construction permits the decoy to be mounted on a branch, as at 18a, which extends at an angle to the horizontal. When the lines, like 15 and 16 are drawn tight, the decoy will rock about the ledge 23 so as to assume an upright position (when viewed from the front).

Fig. 7 illustrates a modified form of the invention in which the bail 12′ is formed with a horizontally extending section 24 arranged to rest on the top of a supporting tree branch or the like 18′. In this case, the vertical section 25 between the section 24 and the undersurface of the body 11' simulates a bird's legs. The elevating line 16' is attached to the bail 12' at 17', just below the horizontal section 24.

In elevating the decoy of Fig. 7 toward a branch it will assume a position somewhat similar to that shown in Fig. 3 until the horizontal section 24 engages the branch 18'. Thereafter, the tipper line 15' is manipulated in a manner similar to that described heretofore to locate the decoy in its upright position.

Since the upper portion of the bail, as seen in Figs. 1 and 7, i.e., that portion directly adjacent and above the supporting tree branch, simulates the legs and feet of a bird, it will be considered in the claims appended hereto that the term "body" includes such upper portion.

Although I have described my invention in detail and have therefore used certain specific terms and languages herein, it is to be understood that the present invention is illustrative rather than restrictive and therefore changes and modifications may be made without departing from the spirit or scope of invention as set forth in the accompanying claim. For example, although it is preferable to locate the bail 12 somewhat to the rear of the center of gravity 14, the bail could, according to the broader aspects of the invention, be placed substantially in line with such center of gravity and yet be effective to rock the decoy into its upright position. Further, although the brace is in the form of a bail, it could also, although somewhat less effectively, comprise a single stiff piece of wire or the like depending from the body.

Also, although the tipper and elevating lines are described as separate lines, they may comprise the opposite halves of a single line.

What I claim is:

An animal decoy adapted to be mounted on a tree limb or the like comprising a decoy body, a stiff inverted substantially U-shaped brace, the legs of said brace being integral with the underside of said body and extending downwardly from said body when said body is in normal position, the length of said brace extending along a line located adjacent the center of gravity of said body, a first line attached at one end to the apex of said brace for locating said body in normal position when resting on said limb, and a second line attached at one end to a point on the underside of said body intermediate the legs of said brace and to the rear of said center of gravity when said body is in normal position, said second line being adapted to be swung over said limb whereby to raise said body to said limb.

References Cited in the file of this patent

UNITED STATES PATENTS

| | | |
|---|---|---|
| 1,527,711 | Stallman | Feb. 24, 1925 |
| 2,757,481 | Johnson et al. | Aug. 7, 1956 |